(12) United States Patent
Rimini et al.

(10) Patent No.: US 8,509,208 B2
(45) Date of Patent: Aug. 13, 2013

(54) FREQUENCY ERROR ESTIMATION

(75) Inventors: Roberto Rimini, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1275 days.

(21) Appl. No.: 12/188,619

(22) Filed: Aug. 8, 2008

(65) Prior Publication Data

US 2009/0196274 A1 Aug. 6, 2009

Related U.S. Application Data

(60) Provisional application No. 61/025,641, filed on Feb. 1, 2008.

(51) Int. Cl.
*H04J 1/00* (2006.01)

(52) U.S. Cl.
USPC ........................................ 370/343; 455/150.1

(58) Field of Classification Search
None
See application file for complete search history.

(56) References Cited

U.S. PATENT DOCUMENTS

| | | | |
|---|---|---|---|
| 6,891,792 B1 | 5/2005 | Cimini, Jr. et al. | |
| 6,922,388 B1 | 7/2005 | Laroia et al. | |
| 7,123,670 B2 | 10/2006 | Gilbert et al. | |
| 7,423,959 B2 * | 9/2008 | Gavillero et al. | 370/208 |
| 7,606,138 B2 * | 10/2009 | Wang et al. | 370/210 |
| 2004/0120410 A1 | 6/2004 | Priotti | |
| 2005/0047518 A1 | 3/2005 | Auer | |
| 2005/0152326 A1 | 7/2005 | Vijayan et al. | |
| 2005/0251844 A1 | 11/2005 | Martone et al. | |
| 2010/0054235 A1 * | 3/2010 | Kwon et al. | 370/350 |
| 2011/0235684 A1 * | 9/2011 | Dahlman et al. | 375/135 |

FOREIGN PATENT DOCUMENTS

| | | |
|---|---|---|
| CN | 1528059 A | 9/2004 |
| CN | 1643867 A | 7/2005 |
| RU | 2303856 C2 | 7/2007 |
| WO | 2004114615 A1 | 12/2004 |
| WO | WO 2005071911 A1 | 8/2005 |

OTHER PUBLICATIONS

Liu, Deliang, et al., All digital frequency offset tracking loop in OFDM systems. IEEE, 2005, 0-7803-9335-X/05; pp. 241-245.
International Search Report and the Written Opinion—PCT/US2009/032533 International Search Authority—European Patent Office—Jun. 8, 2009.
Natali F D: "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.
Roberto Rimini et al: "A Robust Frequency Tracking Loop at the eNodeB for LTE Uplink" Spread Spectrum Techniques and Applications, 2008. ISSSTA 08. IEEE 10th International Symposium on, IEEE, Piscataway, NJ, USA, Aug. 25, 2008, pp. 97-102, XP031318990 ISBN: 978-1-4244-2203-6 the whole document.
Taiwan Search Report—TW098103266—TIPO—Aug. 8, 2008.

* cited by examiner

*Primary Examiner* — Kevin C Harper
*Assistant Examiner* — Rhonda Murphy
(74) *Attorney, Agent, or Firm* — Kenneth K. Vu; Dalei Dong

(57) ABSTRACT

Aspects relate to frequency estimation and tracking. Frequency information is extracted based on an observation of a single symbol carrying pilot tones, which can be at any bandwidth location. Specifically, the frequency error information is extracted after selecting tones assigned to a specific user. The frequency error can be corrected based on the estimation. Further, the disclosed aspects can be applied to multi-path environments.

25 Claims, 14 Drawing Sheets

FREQUENCY ERROR ESTIMATION

CROSS-REFERENCE

This application claims the benefit of U.S. Provisional Application Ser. No. 61/025,641, filed Feb. 1, 2008, entitled "FREQUENCY ERROR ESTIMATION METHOD FOR LTE UL", assigned to the assignee hereof and the entirety of which is incorporated herein by reference.

BACKGROUND

I. Field

The following description relates generally to wireless communications and more particularly to estimating frequency error.

II. Background

Wireless communication systems are widely deployed to provide various types of communication content, such as voice, data, and so forth. These systems may be multiple-access systems capable of supporting communication with multiple users by sharing available system resources (e.g., bandwidth, transmit power, and so on). Examples, of multiple-access systems include code division multiple access (CDMA) systems, time division multiple access (TDMA) systems, frequency division multiple access (FDMA) systems, 3GPP Long Term Evolution (LTE) systems, orthogonal frequency division multiple access (OFDMA) systems, and others.

Generally, a wireless multiple-access communication system can simultaneously support communication for multiple wireless terminals. Each terminal communicates with one or more base stations through transmissions on the forward and reverse links. The forward link (or downlink) refers to the communication from the base stations to the terminals and the reverse link (or uplink) refers to the communication link from the terminals to the base stations. The communication link can be established through a single-in-single-out (SISO), multiple-in-single-out (MISO), or a multiple-in-multiple-out (MIMO) system.

Generally, to estimate a frequency error at least two consecutive training sequences (e.g. pilot symbols) are utilized. However, some systems only provide a single training sequence and/or more than one training sequence, each appearing in a different frequency area. Frequency error estimation cannot be reliably estimated in systems that do not provide two consecutive training sequences occupying the same bandwidth.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with frequency estimation and tracking. The frequency information can be extracted based on observation of a single symbol, such as an OFDM symbol, carrying pilot tones irrespective of the symbol's bandwidth location. For example, the frequency error information can be extracted after selecting tones assigned to a specific mobile device (e.g., post-FFT (fast Fourier transform)). A time domain representation of the extracted pilot symbols can be multiplied by a local pilot sequence and the resultant sequence projected in a top and lower half circle by multiplication with a rotating phasor at $\pm/-0.5$ sub-carrier spacing (e.g., any interval of the spacing between 0 and 1). The difference of the magnitude of the resultant vectors can carry the frequency error information.

An aspect relates to a method for frequency error estimation. The method includes extracting a pilot tone in a frequency domain for a first user from a first antenna and performing Inverse Discrete Fourier Transform to translate the frequency domain of the pilot tone into a first time domain sequence for the first antenna. The method also includes multiplying the first time domain sequence with a conjugate of a local replica to obtain a resultant sequence and modulated sequences and projecting the resultant sequence and modulated sequences in an upper half circle and a lower half circle. Further, the method includes computing a magnitude square of a vector sum for the upper half circle and the lower half circle to estimate a frequency error correction and correcting a frequency error by multiplying the first time domain sequence with a rotating phasor.

Another aspect relates to a wireless communications apparatus that includes a memory and a processor. The memory retains instructions related to extracting a pilot tone in a frequency domain for a first user from a first antenna, performing Inverse Discrete Fourier Transform to translate the frequency domain of the pilot tone into a first time domain sequence for the first antenna, and multiplying the first time domain sequence with a conjugate of a local replica to obtain a resultant sequence and modulated sequences. The memory also retains instructions related to projecting the resultant sequence and modulated sequences in an upper half circle and a lower half circle, computing a magnitude square of a vector sum for the upper half circle and the lower half circle to estimate a frequency error correction, and correcting a frequency error by multiplying the first time domain sequence with a rotating phasor. The processor is coupled to the memory and is configured to execute the instructions retained in the memory.

Still another aspect relates to a wireless communications apparatus that estimates frequency error. The apparatus includes means for extracting a pilot tone in a frequency domain for a first user from a first antenna and means for performing Inverse Discrete Fourier Transform to translate the frequency domain of the pilot tone into a first time domain sequence for the first antenna. The apparatus also includes means for multiplying the first time domain sequence with a conjugate of a local replica to obtain a resultant sequence and modulated sequences and means for projecting the resultant sequence and modulated sequences in an upper half circle and a lower half circle. Further, the apparatus includes means for computing a magnitude square of a vector sum for the upper half circle and the lower half circle to estimate a frequency error correction and means for correcting a frequency error by multiplying the first time domain sequence with a rotating phasor.

Yet another aspect relates to a computer program product comprising a computer-readable medium. The computer-readable medium includes a first set of codes for causing a computer to extract a pilot tone in a frequency domain for a first user from a first antenna and a second set of codes for causing the computer to perform Inverse Discrete Fourier Transform to translate the frequency domain of the pilot tone into a first time domain sequence for the first antenna. Also included is a third set of codes for causing the computer to multiply the first time domain sequence with a conjugate of a local replica to obtain a resultant sequence and modulated sequences and a fourth set of codes for causing the computer to project the resultant sequence and modulated sequences in an upper half circle and a lower half circle. The computer-readable medium also includes a fifth set of codes for causing the computer to compute a magnitude square of a vector sum for the upper half circle and the lower half circle to estimate a frequency error correction and a sixth set of codes for causing the computer to correct a frequency error by multiplying the first time domain sequence with a rotating phasor.

A further aspect relates to at least one processor configured to estimate and correct a frequency error. The processor includes a first module for extracting a pilot tone in a frequency domain for a first user from a first antenna, a second module for performing Inverse Discrete Fourier Transform to translate the frequency domain of the pilot tone into a first time domain sequence for the first antenna, and a third module for multiplying the first time domain sequence with a conjugate of a local replica to obtain a resultant sequence and modulated sequences. The processor also includes a fourth module for projecting the resultant sequence and modulated sequences in an upper half circle and a lower half circle, a fifth module for computing a magnitude square of a vector sum for the upper half circle and the lower half circle to estimate a frequency error correction, and a sixth module for correcting a frequency error by multiplying the first time domain sequence with a rotating phasor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
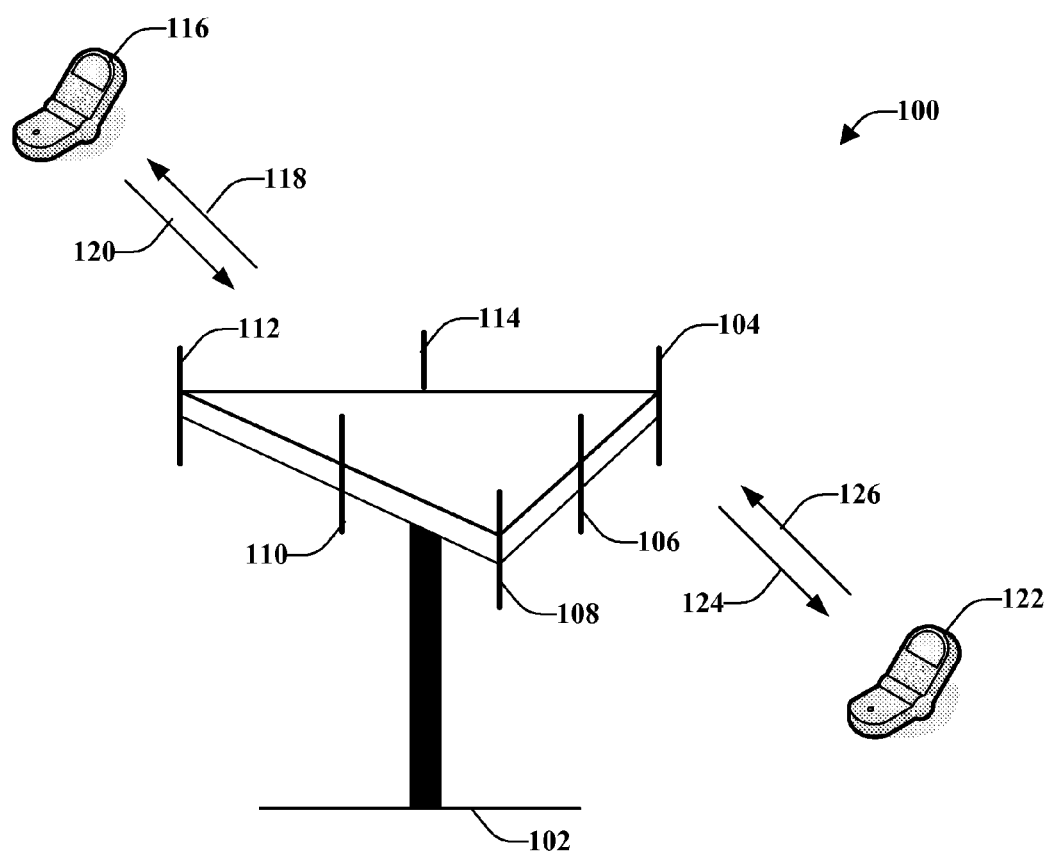
FIG. 1 illustrates a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

With reference to FIG. 1, illustrated is a multiple access wireless communication system 100 according to one or more aspects. A wireless communication system 100 can include one or more base stations in contact with one or more user devices. Each base station provides coverage for a plurality of sectors. A three-sector base station 102 is illustrated that includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over forward link 118 and receive information from mobile device 116 over reverse link 120. Forward link (or downlink) refers to the communication link from the base stations to mobile devices, and the reverse link (or uplink) refers to the communication link from mobile devices to the base stations. Mobile device 122 is in communication with antennas 104 and 106, where antennas 104 and 106 transmit information to mobile device 122 over forward link 124 and receive information from mobile device 122 over reverse link 126. In a FDD system, for example, communication links 118, 120, 124, and 126 might utilize different frequencies for communication. For example, forward link 118 might use a different frequency than the frequency utilized by reverse link 120.

Each group of antennas and/or the area in which they are designated to communicate may be referred to as a sector of base station 102. In one or more aspects, antenna groups each are designed to communicate to mobile devices in a sector or the areas covered by base station 102. A base station may be a fixed station used for communicating with the terminals.

In communication over forward links 118 and 124, the transmitting antennas of base station 102 can utilize beamforming in order to improve a signal-to-noise ratio of forward links for the different mobile devices 116 and 122. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

In accordance with some aspects, wireless communication system 100 is configured to facilitate frequency estimation and tracking. The frequency information can be extracted based on observation of a single symbol, such as an OFDM symbol, carrying pilot tones irrespective of the symbol's bandwidth location. For example, the frequency error information can be extracted after selecting tones assigned to a specific mobile device (e.g., post-FFT (fast Fourier transform)).

The disclosed aspects, provide a scheme to estimate the frequency error at a receiver node (e.g., at the eNodeB cell for a LTE system). Although various aspects might be described by referring to Single-Carrier Frequency Division Multiple Access (SC-FDMA) as the multiple access scheme consistent with Long Term Evolution (LTE) up-link (UL), the disclosed aspects are not limited to this scheme and can extend to a generic OFDMA scheme and other schemes.

The disclosed aspects provide several advantages, such as frequency error estimation based on the observation of a single OFDM symbol carrying pilot tones. Another advantage is that there is no channel estimation necessary to implement the disclosed aspects. Further, the disclosed aspects are robust to multi-path systems and have a low implementation complexity.

Some aspects will be described with reference to frequency estimation and tracking at a Base Station site (e.g., referred to as eNodeB in LTE terminology). The multiple access scheme for the LTE up-link (UL) is FDMA based (e.g., a different sub-set of available sub-carriers is assigned to each user).

The problem of frequency error arises for at least two main reasons. First, a local oscillator (LO) of a transmitter (e.g. a mobile device or another transmitting device) has an offset with respect to the offset utilized at a receiver device (e.g., eNodeB). This mismatch can be caused by clock drifting, temperature variations, aging, as well as other factors. One or more of these aspects can be experienced by any wireless modem. Secondly, Doppler shift of the carrier frequency caused by relative motion of the mobile device in presence of a strong specular component, normally referred as Line-of-Sight (LOS), which is often encountered in wireless cellular communication, can cause frequency error.

Although the receiving device (e.g., eNodeB) can send periodic messages to inform the transmitting device (e.g. mobile device) of timing adjustments of its local clock, there can be some residual mismatch between the Local Oscillators (LO) of the terminal and the network. Moreover, the frequency shift caused by a Doppler effect cannot be pre-compensated and particular attention should be provided for high data rate/high order modulation.

The resultant effect is that after down conversion to baseband, the received signal at the receiving device (e.g. eNodeB) can be affected by a frequency offset which translates in a rotation of the modulation constellation. This effect can cause severe degradation to the modem performance especially if high order modulation are being employed (e.g., 16-QAM, 64-QAM, and so forth).

To help overcome this problem, the receiver modem can be equipped with a frequency correction device that estimates this frequency error and compensates for the frequency error by simply de-rotating the received signal using, for example, a Numeric Controlled Oscillator.

Some techniques for frequency error estimation can be grouped in at least two categories: time domain processing and frequency domain processing. Time domain processing exploits a Cyclic Prefix (CP) structure, which is found in OFDM numerology. The frequency error information is extracted from correlating the CP with the last portion of the OFDM symbol and computing the arctang of the result. While this method is used in WLAN, it cannot be applied to uplink (UL) LTE where each user experiences a different frequency shift so that the eNodeB needs to estimate and correct the frequency error for each user independently. This requirement results in estimating the frequency estimation after the FFT where each user is separated in virtue of the FDM structure of the LTE up-link (UL), which can be performed in accordance with the disclosed aspects.

Figure 2:
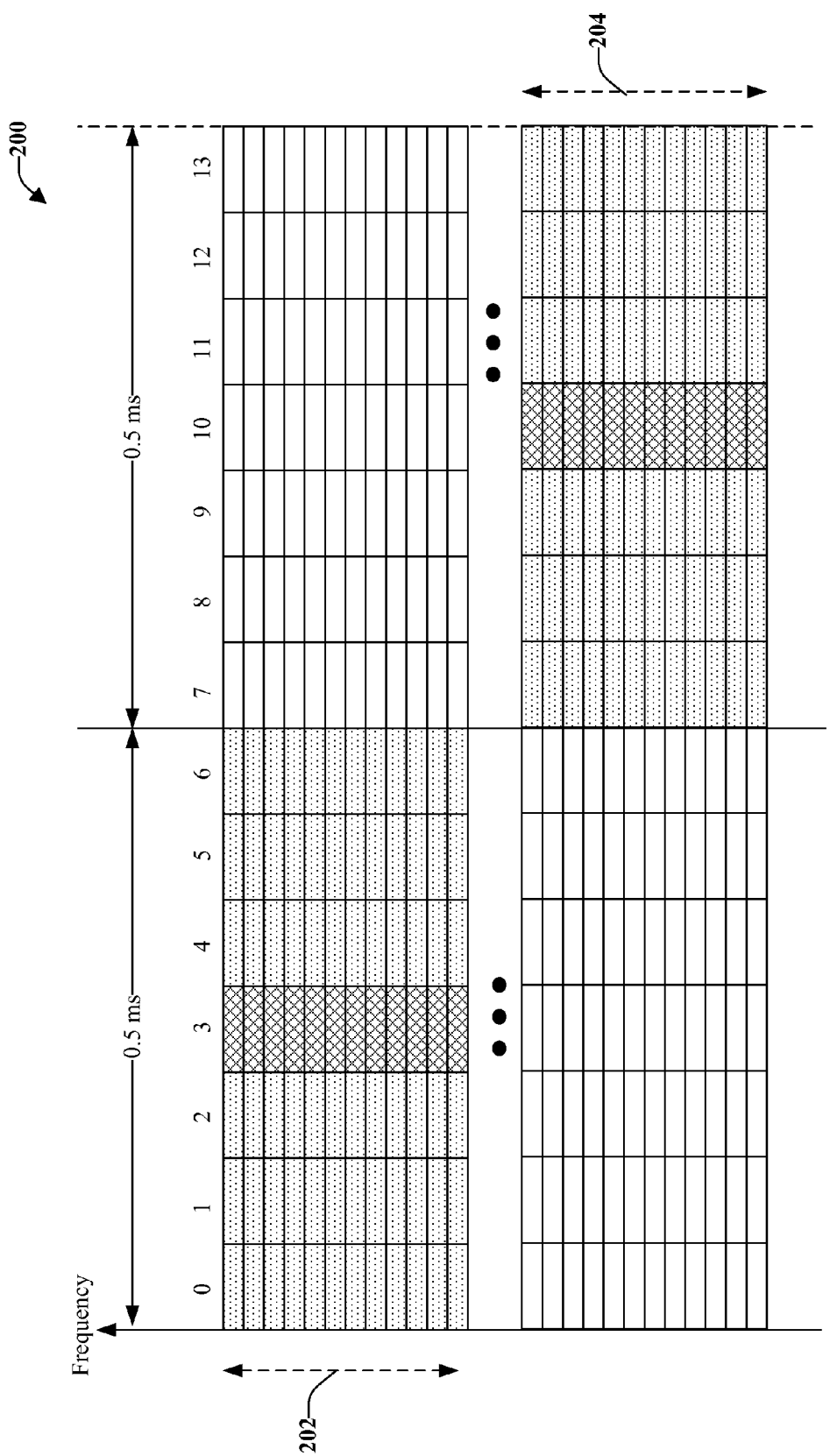
FIG. 2 illustrates a schematic representation of pilot symbols occupying different sub-carrier locations due to frequency hopping.

Traditional frequency domain approaches for estimating the frequency error rely on the assumption of two consecutive OFDM symbols carrying pilot tones. The frequency error information is extracted by cross correlating these corresponding tones and computing the arctang. This method however is not applicable to LTE UL (and other networks) because the pilot symbols are well separated in time (which results in reduced pull-in range) and more important, the pilot symbols may occupy different sub-carriers locations due to frequency hopping. FIG. 2 illustrates a schematic representation 200 of pilot symbols occupying different sub-carrier locations due to frequency hopping.

Illustrated are SC-FDMA symbol time locations (horizontal axis), labeled 0 through 13, and sub-carrier locations in the vertical axis. The figure illustrates a Physical Uplink Shared Channel (PUSCH) structure with intra-TTI (Transmission Time Interval) hopping for an UL LTE system. In the first slot (symbol index 0 to 6) the PUSCH and reference signal (RS) occupy the top portion of the bandwidth 202. In the second slot (symbol index 7 to 13) the same channels occupy a different sub-carrier set of the allocated bandwidth, as illustrated at 204. This can be referred to a chu shift separation.

Figure 3:
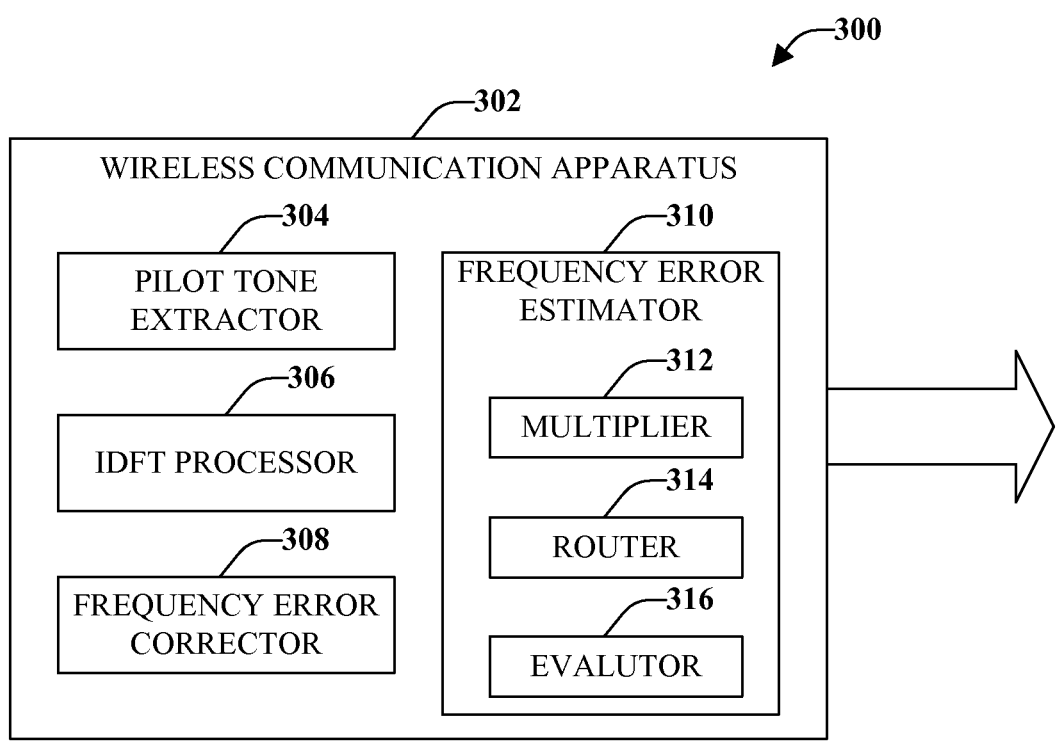
FIG. 3 illustrates a system that performs frequency error estimation in a wireless communication environment.

FIG. 3 illustrates a system 300 that performs frequency error estimation in a wireless communication environment. System 300 is configured to estimate a frequency error of each transmitter device at a receiver device. The frequency error estimate can be based on the observation of a single symbol carrying pilot tones located anywhere in the bandwidth. System 300 provides a moderate to low implementation complexity and does not need channel information (non-coherent). Further, system 300 can be applied to multi-path environments.

System 300 includes a wireless communication apparatus 302 that is shown to be transmitting data through a channel. Although depicted as transmitting data, wireless communication apparatus 302 can also receive data through the channel (e.g., wireless communication apparatus 302 can concurrently transmit and receive data, wireless communication apparatus 302 can transmit and receive data at differing times, or combinations thereof). Wireless communication apparatus 302 can be a base station, a mobile device, or the like.

Included in wireless communications apparatus 302 is a pilot tone extractor 304 that is configured to extract the tones for each user (e.g. mobile device) according to the respective bandwidth allocation. The pilot tones can be extracted in a frequency domain. In accordance with some aspects, the pilot tones can be extracted for a first mobile device from a first antenna and a second antenna.

Also included in wireless communications apparatus 302 is an IDFT processor 306 that is configured to perform IDFT processing to translate the frequency domain of the pilot tones into time domain sequences for the first antenna and the second antenna.

A frequency error corrector 308 is configured to correct a frequency error. The frequency error corrector 308 can multiply the time domain sequence with a rotating phasor. In accordance with some aspects, the rotating phasor can be generated by a Numerically Controlled Oscillator (NCO), which is driven by the frequency error estimation.

Also included in wireless communications apparatus 302 is a frequency error estimator 310 that is configured to estimate a frequency error per mobile device. Included in frequency error estimator 310 is a multiplier 312 that is configured to multiply the received pilot time domain sequence with a conjugate of a local replica. A router 314 projects each of the resultant sequences in an upper half circle and a lower half circle. In accordance with some aspects, the resultant sequences are projected into each of the half circles by multiplying with exp respectively. This operation is substantially the same as computing a DFT at a fraction of the sub-carrier spacing.

Also included in frequency error estimator 310 is an evaluator 316 that computes the magnitude square of the vector sum for each half circle and subtracts the two results (one result for each half circle) to obtain an estimate of the frequency error. Further details relating to the frequency error estimator 310 will be provided below.

In accordance with some aspects, wireless communications apparatus 302 also include a selector (not illustrated) that is configured to select multi-path components from each of the time domain sequences. Also included can be a combiner (not illustrated) that is configured to combine frequency error corrections from each of the multi-path components to achieve a combined frequency error correction.

System 300 can include memory operatively coupled to wireless communications apparatus 302. Memory can be external to wireless communications apparatus 302 or can reside within wireless communications apparatus 302. Memory can store information related to estimating a frequency error in accordance with the disclosed aspects. A processor can be operatively connected to wireless communications apparatus 302 (and/or memory) to facilitate analysis of information related to frequency error estimation in a communication network. Processor can be a processor dedicated to analyzing and/or generating information received by wireless communications apparatus 302, a processor that controls one or more components of system 300, and/or a processor that both analyzes and generates information received by wireless communications apparatus 302 and controls one or more components of system 300.

Memory can store protocols associated with frequency error correction, taking action to control communication between wireless communications apparatus 302 and other system 300 devices, such that system 300 can employ stored protocols and/or algorithms to achieve improved communications in a wireless network as described herein. For example, memory can store instructions related to extracting a pilot tone in a frequency domain for a first mobile device from a first antenna and performing Inverse Discrete Fourier Transform to translate the frequency domain of the pilot tone into a first time domain sequence for the first antenna. The instructions can also relate to multiplying the time domain sequence with a conjugate of a local replica to obtain a resultant sequence and modulated sequences and projecting the resultant sequence and modulated sequences in an upper half circle and a lower half circle. Further, the instructions can relate to computing a magnitude square of a vector sum for the upper half circle and the lower half circle to estimate a frequency error correction and correcting a frequency error by multiplying the time domain sequence with a rotating phasor.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 320 of the disclosed aspects are intended to comprise, without being limited to, these and other suitable types of memory.

Figure 4:
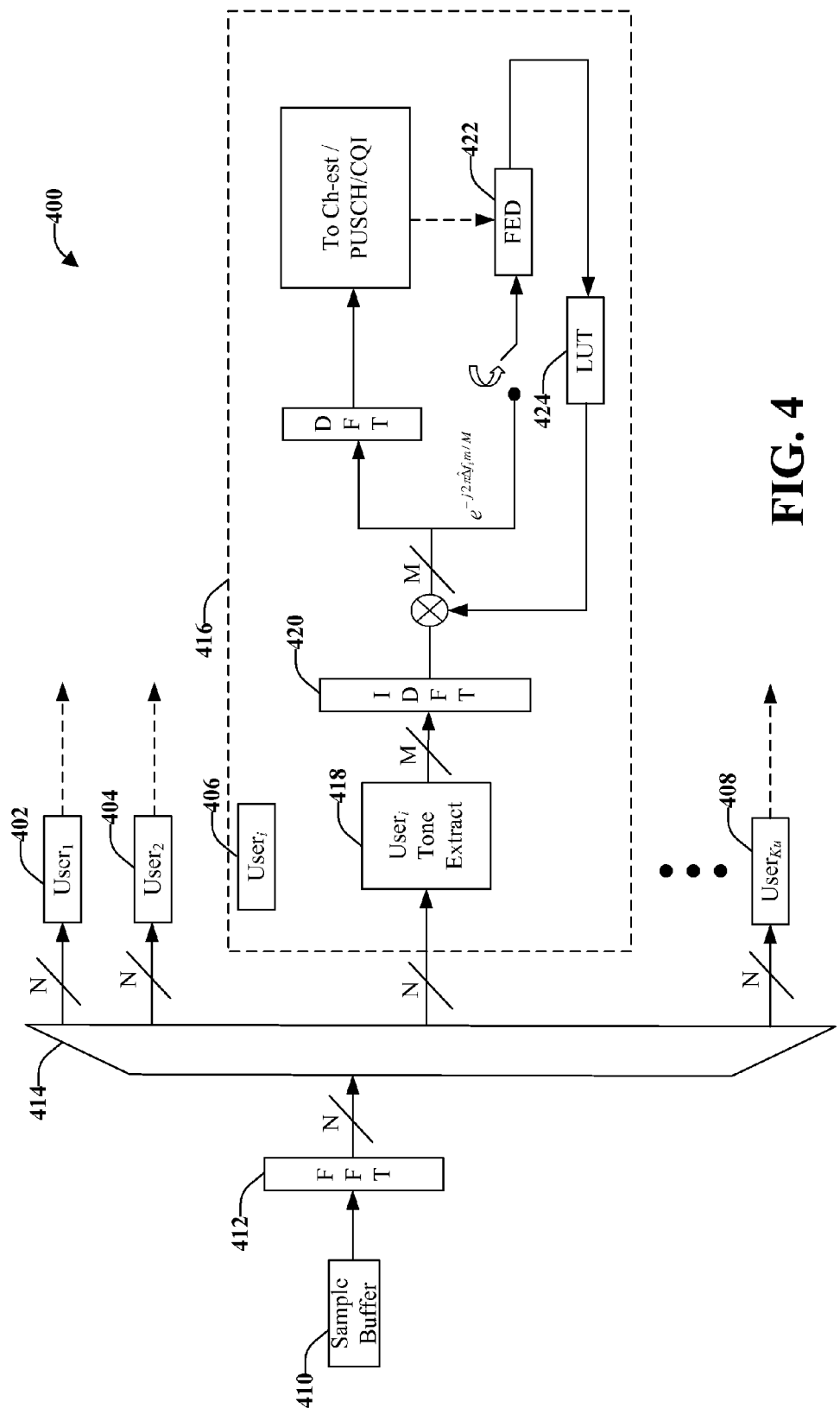
FIG. 4 illustrates a high-level schematic representation of a frequency tracking loop in accordance with various aspects.

FIG. 4 illustrates a high-level schematic representation 400 of a frequency tracking loop in accordance with various aspects. This figure is presented with respect to a base station, however, the disclosed aspects apply to other devices. As illustrated, a group of users (e.g., mobile devices) is processed by an eNodeB. The mobile devices are illustrated as: $User_1$ 402, $User_2$ 404, $User_j$ 406 through $User_{Ku}$ 408, where Ku is an integer. Notation "N" refers to system FFT size and notation "M" refers to user sub-carriers.

A signal is received at each antenna and is processed through a buffer 410. Fast Fourier Transform (FFT) processing 412 is conducted on the received signal. The there are n tones, where n is an integer. Each user 402, 404, 406, 408 occupies a different subset of the n tones. In a simple example, n is equal to 20. The first user 402 occupies tones 1 through 5, the second user 404 occupies tones 6 through 8, the third user 406 occupies tones 9 to 11, and so forth, such that the tones do not overlap. Further, the tones are on different frequencies. The signal is multiplexed 414 to the different users 402, 404, 406, 408 that are served at substantially the same time.

The frequency tracking loop operates independently on each user 402, 404, 406, and 408. This loop is illustrated in detail with respect to User$_i$ 406, as illustrated in dashed box 416. Since it is predefined which tones are occupied by User$_i$ 406, those subset of M-tones, where M is an integer, are extracted, at 418 according the its bandwidth allocation. An Inverse Discrete Fourier Transform (IDFT) 420 is performed to convert the extracted tones 418 to time domain samples. A Frequency Error Discriminator (FED) block 422 estimates a frequency error, which is corrected through a digital phase rotator synthesized with a Look-Up Table (LUT) 424. In accordance with some aspects, the FED 422 receives pilot samples in a manner similar to a TDM system. The frequency error information is extracted utilizing a frequency error detector as will be explained in more detail with reference to the following figures.

A similar frequency tracking loop is duplicated for each mobile device (e.g., user) because each mobile device may experience a different frequency error. Different users can be moving at different rates of speed and the different rates (e.g. Doppler Shift) can translate into a frequency error. For example, a first user is traveling in a car traveling at 50 miles per hour, a second user is on a train that is traveling much faster, another user is walking, and so forth. The amount of frequency error can be proportional to the rate of speed. Thus, the frequency error is estimated per user and is corrected on a per user basis.

Figure 5:
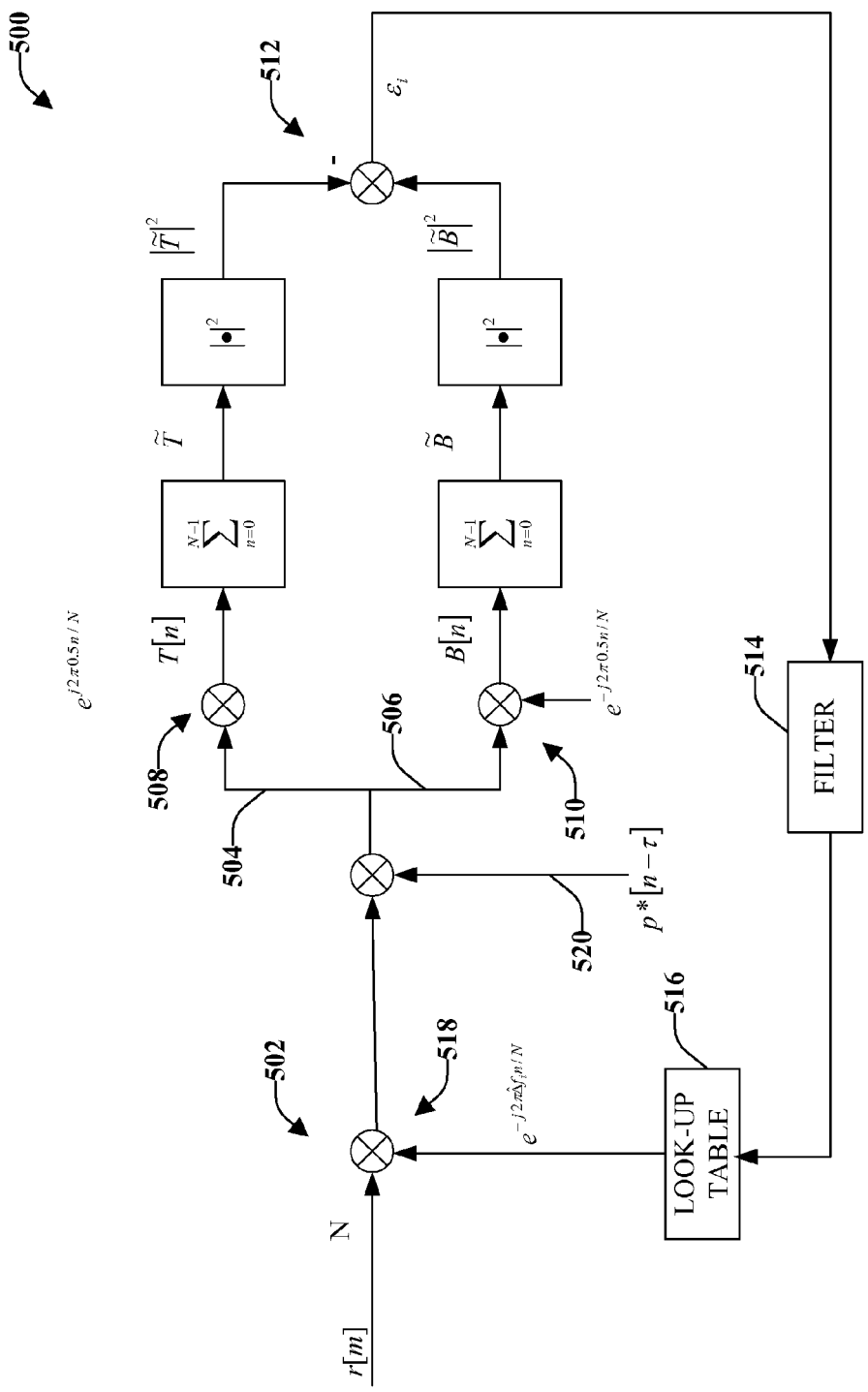
FIG. 5 illustrates a schematic representation of a frequency error detector in accordance with the disclosed aspects.

FIG. 5 illustrates a schematic representation of a frequency error detector 500 in accordance with the disclosed aspects. The following will describe an intuitive justification algorithm. A time domain signal r[m] is received, as illustrated at 502. In accordance with some aspects, the signal can be received in a frequency domain and converted to a time domain though various techniques, such as Inverse Discrete Fourier Transform (IDFT).

The time domain received signal r[m]=p$_\lambda$[m−τ]e$^{j2\pi \Delta f_e n/N}$+ n$_w$[n] is multiplied element by element by the conjugate of a local time domain pilot sequence to remove the pilot symbols polarity. The received signal that is in the time domain is correlated against a known sequence. The known sequence can be derived since in a particular time instance when the signal is received, the signal carries pilot tones, which are already known and, thus, can be duplicated.

The resultant sequence is then "projected" in a top half 504 and the bottom half 506 of the unit circle. A local pilot, denoted by T[n], is generated. The local pilot T[n] is the index in time. Each received signal is multiplied with the local pilot. In this manner, there is a generic and un-modulated sequence (e.g., no polarity). In accordance with some aspects, the projection at the top half 504 and the bottom half 506 is similar to a Discrete Fourier Transform (DFT) computed at a fraction of the sub-carrier spacing.

When multiplied by a complex number, such as a complex conjugate, an "ideal" signal can be achieved, if there is no frequency error. Thus, in an "ideal" scenario of no frequency error and no noise, the resultant sequence results in all ones ("1"s). Projecting the resultant sequence on the top half 504 and bottom half 506 of the unit circle, can be achieved by multiplying the resultant sequence with e$^{j2\pi 0.5n/N}$ (at 508) and e$^{-j2\pi 0.5n/N}$ (at 510).

$\tilde{T}$ denotes the vector sum of all the unit phasors located in the top half circle 504 and $\tilde{B}$ denotes the vector sum of all the unit phasors located in the bottom half circle 506, as illustrated. The difference of the magnitude square of the resultant vector sum of each branch (top half circle 504 and bottom half circle 506) conveys frequency error information.

Figure 6:
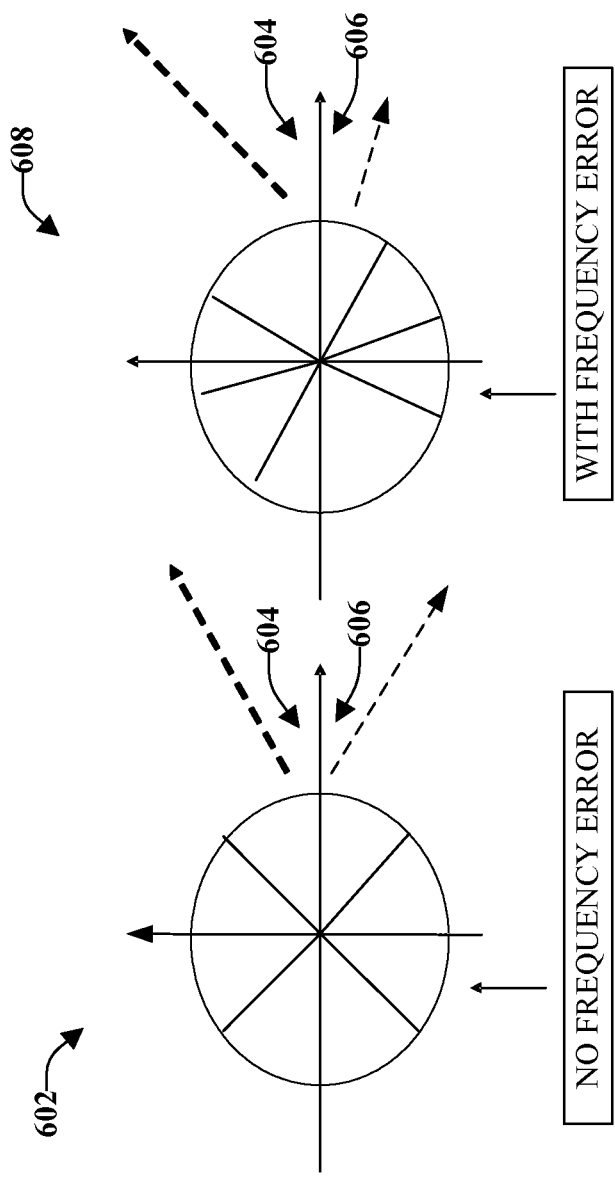
FIG. 6 illustrates an intuitive justification of a "projection" algorithm.

As illustrated in FIG. 6, if there is no frequency error, no noise, the top half and bottom half unit phasors distribution would be almost exactly symmetric, as illustrated at 602. Therefore, the magnitude of $\tilde{T}$ and $\tilde{B}$ denoted by the dashed vectors 604 and 606 would be equal in this case, hence zero frequency error would be detected.

However, in the presence of frequency error, the unit phasors of each half circle 504 and 506 rotates by an angle proportional to the frequency error e$^{j2\pi(\Delta f_e \pm 0.5)n/N}$. In this case, the magnitude of the vector sum $\tilde{T}$ and $\tilde{B}$ will not be equal (as the example illustrated at 608), wherein dashed vector 604 is larger than dashed vector 606. The difference of the magnitude of these two vectors is related to the frequency error as per the following equation, where f$_e$ is the frequency error:

$$S(f_e) = E\left[|\tilde{B}(f_e)|^2 - |\tilde{T}(f_e)|^2\right] = \qquad \text{Equation 1}$$

$$\frac{1-\cos[2\pi(f_e - 0.5)]}{1-\cos\left[\frac{2\pi}{N}(f_e - 0.5)\right]} - \frac{1-\cos[2\pi(f_e + 0.5)]}{1-\cos\left[\frac{2\pi}{N}(f_e + 0.5)\right]}(1.0).$$

Equation 1 represents an analytical expression of a S-curve, which can be derived according to the following detailed analytical derivation. Let the Tx x[n] signal be expressed as:

$$x[n] = \sum_{k=0}^{N-1} P_k e^{j2\pi kn/N}, \ \forall\, n = (0, 1 \ldots N-1). \qquad \text{Equation 2}$$

where P$_k$=P$_\lambda$[k] are the frequency domain pilot symbols corresponding to the Chu sequence of root λ. The received signal can be expressed as:

$$r[n] = e^{j2\pi f_{err} n/N} \sum_{k=0}^{N-1} P_k H_k e^{j2\pi kn/N} + w[n]. \qquad \text{Equation 3}$$

where w[n] is the white complex noise and f$_{err}$ denotes the freq error. The top half circle "projection" is given by:

$$T[n] = \qquad \text{Equation 4}$$

$$e^{j2\pi 0.5n/N} r[n] = e^{j2\pi(f_{err} + 0.5)n/N} \sum_{k=0}^{N-1} H_k P_k e^{j2\pi kn/N} + w_T[n].$$

The vector sum of all the top half unit phasors is computed as follows:

$$\tilde{T} = \sum_{n=0}^{N-1} T[n] p*[n]. \qquad \text{Equation 5}$$

where p[n] is locally generated as follows:

$$p[n] = \sum_{k=0}^{N-1} P_k e^{j2\pi kn/N}, \forall n = (0, 1 \ldots N-1). \quad \text{Equation 6}$$

Equation 5 can then be re-written as follows:

$$\tilde{T} = \sum_{n=0}^{N-1}\left[\left(e^{j2\pi(f_{err}+0.5)n/N}\sum_{k=0}^{N-1} H_k P_k e^{j2\pi kn/N} + w_T[n]\right)p*[n]\right]. \quad \text{Equation 7}$$

Under the assumption of flat fading (e.g., $H_k = H$, $\forall k$), Equation 7 can be simplified in the following manner:

$$\tilde{T} = \sum_{n=0}^{N-1}(He^{j2\pi(f_{err}+0.5)n/N} + w_T[n]p*[n]). \quad \text{Equation 8}$$

After algebraic manipulation, Equation 8 can be written as:

$$\tilde{T}(\vartheta_T) = H\frac{e^{j2\pi\vartheta_T/2}\sin(2\pi\vartheta_T/2)}{e^{j2\pi\vartheta_T/2N}\sin(2\pi\vartheta_T/2N)} + \tilde{w}_T \quad \text{Equation 9}$$

where:

$$\vartheta_T = f_{err} + 0.5 \quad \text{Equation 10.}$$

The expected value of the magnitude square of the top half circle phasors sum is then given by:

$$E[|\tilde{T}(\vartheta_T)|^2] = \quad \text{Equation 11}$$
$$E[|H|^2]\frac{\sin^2(2\pi\vartheta_T/2)}{\sin^2(2\pi\vartheta_T/2N)} + \sigma^2 = \frac{1-\cos(2\pi\vartheta_T)}{1-\cos(2\pi\vartheta_T/N)} + \sigma^2.$$

Similarly for the lower (bottom) half circle, the magnitude square of the phasors sum is:

$$E[|\tilde{B}(\vartheta_B)|^2] = \quad \text{Equation 12}$$
$$E[|H|^2]\frac{\sin^2(2\pi\vartheta_B/2)}{\sin^2(2\pi\vartheta_B/2N)} + \sigma^2 = \frac{1-\cos(2\pi\vartheta_B)}{1-\cos(2\pi\vartheta_B/N)} + \sigma^2.$$

where:

$$\vartheta_B = f_{err} - 0.5. \quad \text{Equation 13}$$

Finally the S-curve expression is given by:

$$S(f_e) = E[|\tilde{B}(f_e)|^2 - |\tilde{T}(f_e)|^2] = \quad \text{Equation 13}$$
$$\frac{1-\cos[2\pi(f_{er}-0.5)]}{1-\cos\left[\frac{2\pi}{N}(f_{err}-0.5)\right]} - \frac{1-\cos[2\pi(f_{err}+0.5)]}{1-\cos\left[\frac{2\pi}{N}(f_{err}+0.5)\right]}.$$

With further reference to FIG. 5, at 512, the bottom branch 506 is subtracted from the top branch 504, denoted by the "minus" sign. This is where the two branches 504 and 506 are compared to determine if the branches are equal (zero frequency error) or not equal (frequency error). If the branches are different by a large amount, it indicates a large frequency error.

If the determination is that there is a frequency error, an estimation is performed. Since there is usually noise added, a filter 514 can be utilized, in accordance with some aspects, to mitigate the amount of noise and to provide a "cleaner" estimation.

After filtering, the feedback loop continues to a look-up table 516. The look-up table 516 generates a cosine and sine to correct the received signal (in the time domain) by the estimated frequency, denoted by $\hat{\Delta}f_i$. The feedback loop continues, at 518, and continues to correct a little bit at a time until it converges and corrects for the entire frequency error. This feedback loop can be performed any number of times.

Figure 7:
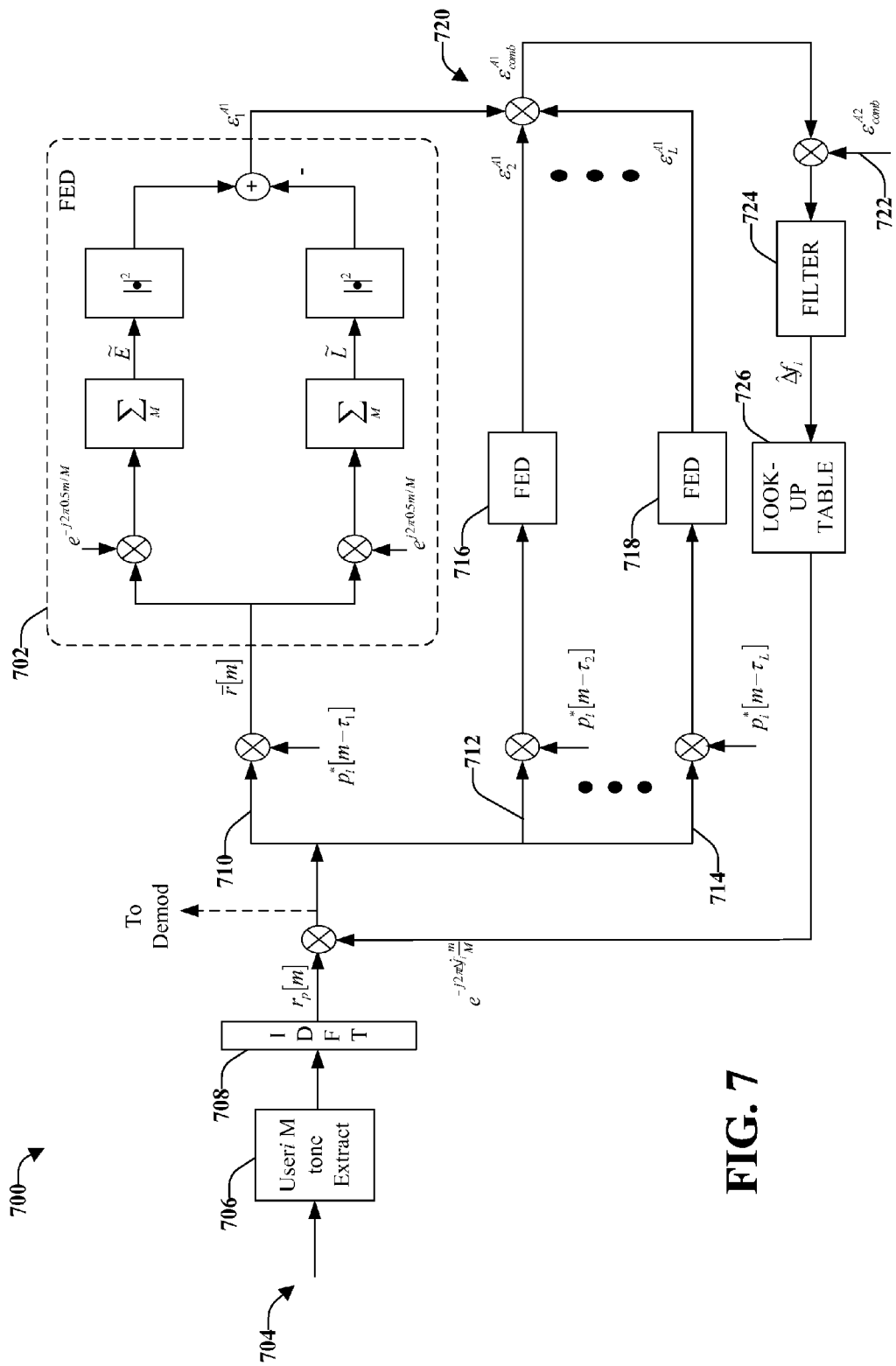
FIG. 7 illustrates a frequency error detector for multi-path channels.

The frequency error detector 500 can be utilized in a multipath environment, as denoted at 520, which will be described with reference to FIG. 7, which illustrates a frequency error detector 700 for multi-path channels. This frequency error detector 700 is an extension of the single path frequency error detector (FED), denoted at 702 by the dashed lines, which was described with reference to FIG. 5 above. To enable correction of multi-path fading, a multitude of FED blocks can be utilized. Each FED block can extract the frequency error information for a specific path. Specifically, the time-domain local replica of the pilot is time aligned to a given resolvable path with delay $\tau_i$, where "i" is the path index.

In a practical implementation, the information on the location of the strongest paths can be provided by a channel estimator, which can be included in a wireless receiver. The error estimations provided by each FED are subsequently combined to smooth-out the noise fluctuations. This can improve the reliability of the frequency error estimation. It should be noted that different types of combining schemes are possible and include equal gain, pilot weighting, Maximal Ratio Combining (MRC), and others. For simplicity purposes, only equal gain combining is illustrated in FIG. 7 without loss of generality.

At substantially the same time as diversity error combining, the resultant error from each antenna can be combined (space-combining) to further improve the robustness of the estimation. The space combining can be enabled regardless of how many multi-paths are available in time, thus, providing diversity.

The disclosed aspects can further extract the frequency error information of co-channel users, such as SDMA users in LTE uplink. The multiplication by the local time-domain pilot replica can also serve the purpose of separate co-channel users by virtue of each user's unique orthogonal pilot sequence. The inner product can be accomplished by multiplying the received multi-user signal with the local pilot copy of a given user, such as user i, and then summing over M samples, as illustrated in the dashed box 702.

The ability to operate in a multi-path environment is an advantage of the disclosed aspects. At a receiver, there can be a delay replica because multi-path propagation signals can arrive with some delay. In further detail, a signal is received at 704 (from FFT). The M tones for a user are extracted, at 706. For example, if a base station is determining the frequency error, the base station might be serving a multitude of users and the frequency error for each user should be determine and corrected independently. The tones are processed through an IDFT 708 and the signal is divided into a number of branches, of which three are illustrated at 710, 712, and 714. Each branch is performing a similar operation, as illustrated with respect to the first path 710 and the FED 702, however, each path experiences a different delay.

Each FED 702, 716, and 718 is locked to a multi-path, thus, $-\tau$ is introduced. Denoted as $p_i^*[m-\tau_1]$ for the first path 710, $p_i^*[m-\tau_2]$ for the second path 712, and so forth through $p_i^*[m-\tau_L]$, where L is an integer that represents the number of paths. When multiplied by a local copy of m-$\tau$, the $\tau$ indicates that the sequence should be delayed and the local copy should be delayed accordingly.

For each multi-path, an $\epsilon$ is estimated, and the $\epsilon$ for all paths are combined, at 720. To further improve and correct a frequency error, a similar operation is repeated for the other antenna(s). Thus, first there is a combination across the paths, resulting in an error $\epsilon_1^{A1}$, on antenna one and a second error $\epsilon_2^{A1}$ on a second antenna (illustrated at 722), and so forth. These errors are input to a filter 724.

By combining the various paths and averaging the frequency error, paths that have a small amount of energy and/or are not reliable are averaged due to the multi-path diversity. The feedback loop continues to a look-up table 724.

In accordance with some aspects, the frequency error can be applied across space (e.g., across antennas). If the receiver can only detect one path, there is no diversity because paths cannot be combined. If there is more than one antenna and the antennas are spaced wide enough apart, each antenna might experience an independent type of fading. For example, one signal might be fading and received at a first antenna while another path, received at a second antenna, has a good signal.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

The various methods disclosed herein can perform frequency error estimation and compensation on a per user basis. In accordance with some aspects, the frequency error estimation and compensation is performed in the time domain.

Figure 8:
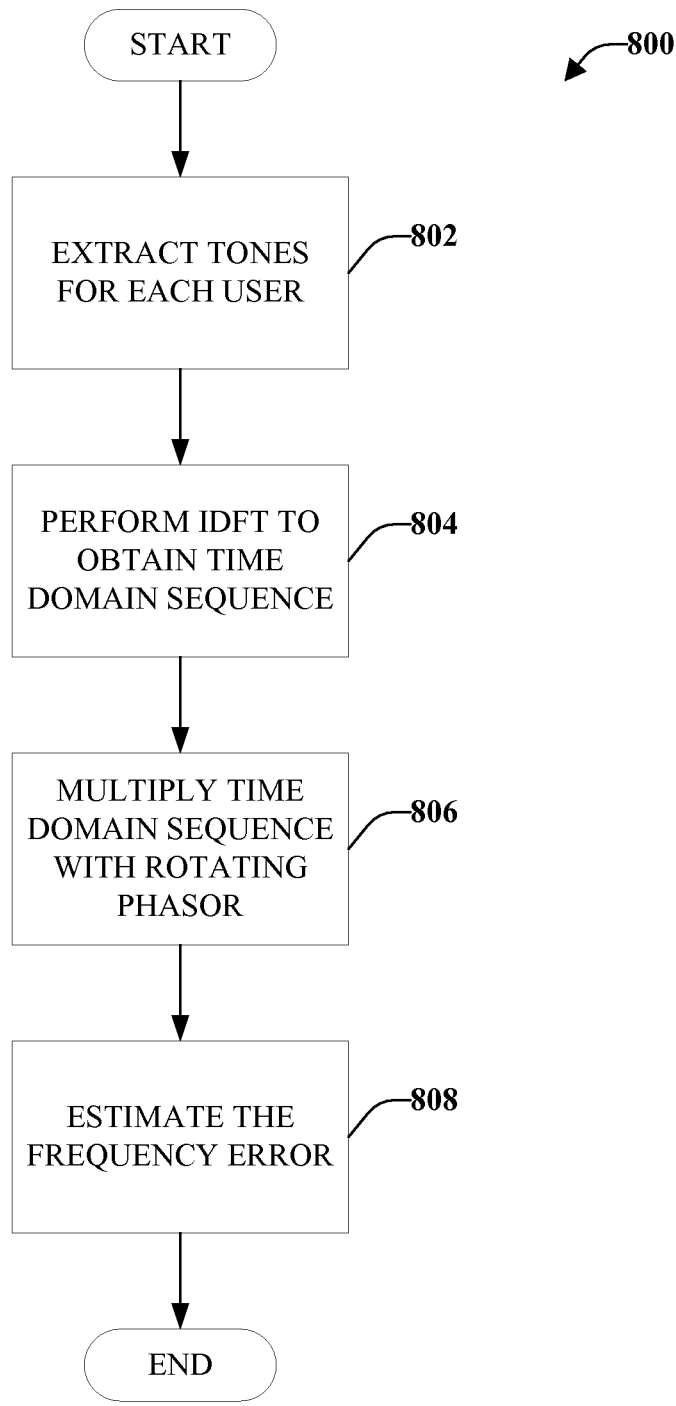
FIG. 8 illustrates a method for estimating a frequency error in a wireless communication system.

FIG. 8 illustrates a method 800 for estimating a frequency error in a wireless communication system. Method 800 is configured to estimate the frequency error for each user (e.g., mobile device) at an eNodeB. Both the frequency estimation and compensation are carried out on a per user (per mobile device) basis in the time domain.

At 802, tones for each user are extracted according to a respective bandwidth allocation. An Inverse Discrete Fourier Transform (IDFT) is performed, at 804, to translate the frequency domain pilot symbols into a time domain sequence.

At 806, the time domain sequence (obtained at 804) is multiplied with a rotating phasor to correct a frequency error. In accordance with some aspects, the rotating phasor can be generated by a Numerically Controlled Oscillator (NCO) driven by the frequency error estimation.

Figure 9:
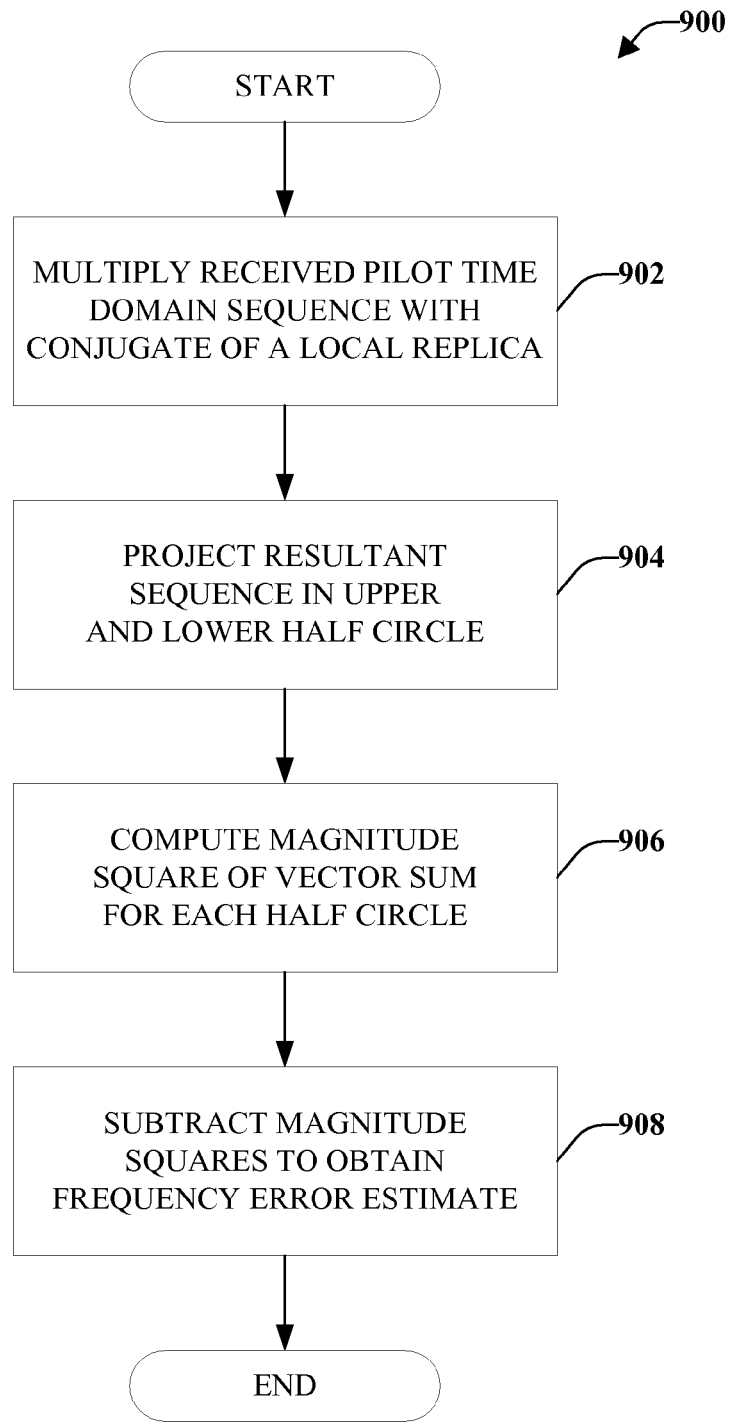
FIG. 9 illustrates a method for estimating a frequency error in accordance with one or more of the disclosed aspects.

The frequency error is estimated, at 808. A method 900 for estimating this frequency error in accordance with one or more of the disclosed aspects is illustrated in FIG. 9.

Method 900 is configured to extract frequency error information from a single symbol (e.g. OFDM symbol) carrying pilot tones. In accordance with some aspects, frequency allocation constraint(s) is not needed. The pilot tones can occupy any bandwidth at any given symbol as it occurs with frequency hopping without influencing the algorithm estimation capabilities. Further, method 900 is robust and can operate in a multi-path environment, provided there is coarse timing information.

At 902, the received pilot time domain sequence is multiplied with the conjugate of a local replica. The resultant sequence is projected in an upper half circle and a lower half circle, at 904. This projection can include multiplying the resultant sequence with exp respectively. At 906, the magnitude square of the vector sum for each half circle is computed. At 908, the two quantities (derived at 906) are subtracted to obtain an estimate of the frequency error. This operation is substantially the same as computing a DFT at a fraction of the sub-carrier spacing.

Figure 10:
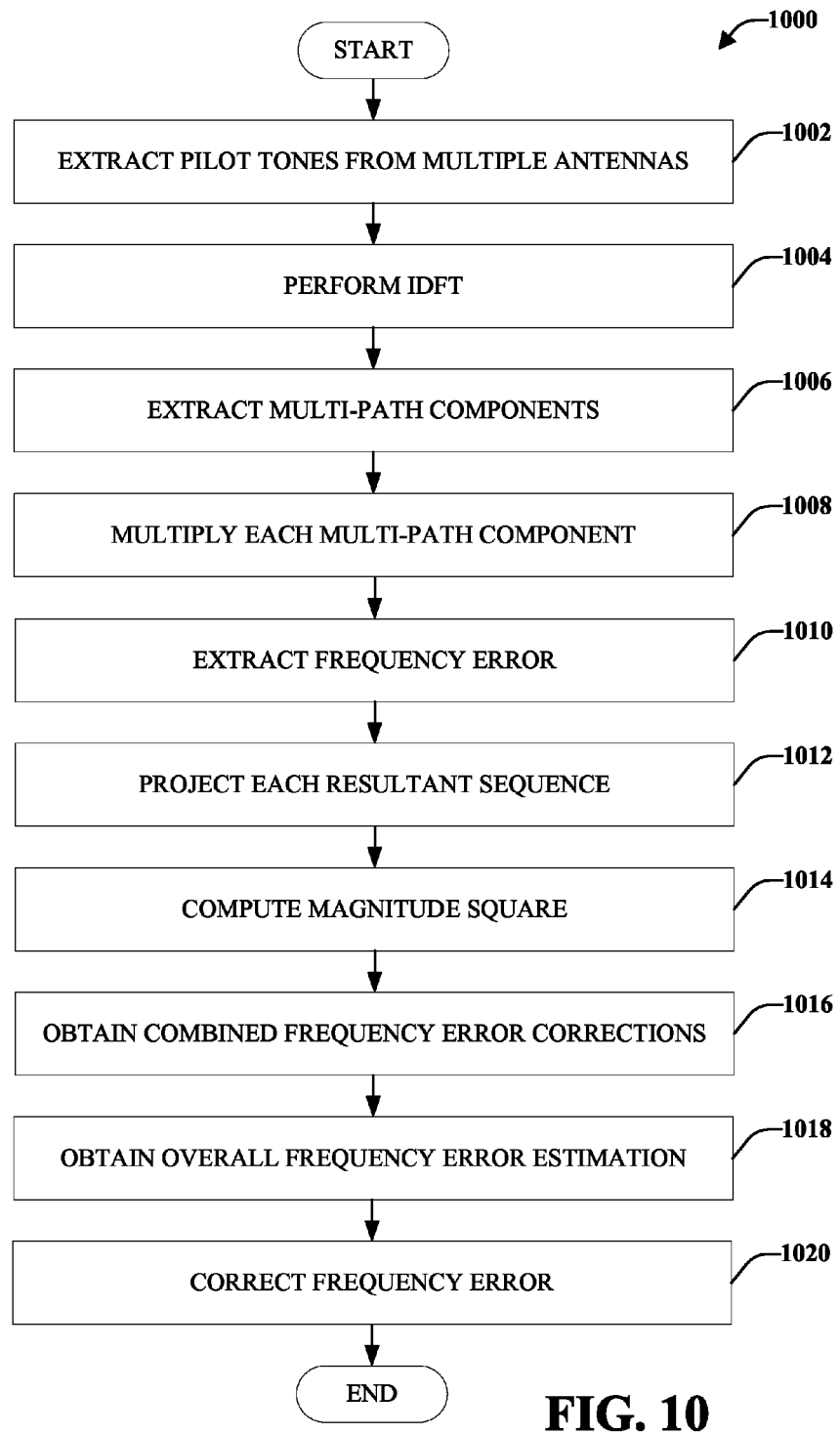
FIG. 10 illustrates a method for frequency error estimation for multiple antennas.

FIG. 10 illustrates a method 1000 for frequency error estimation for multiple antennas. At 1002 a first pilot tone for a first user is extracted from a first antenna and a second pilot tone for the first user is extracted from a second antenna. At 1004, IDFT is performed to translate the frequency domain of the first pilot tone into a first time domain sequence for the first antenna and the second pilot tone into a second time domain sequence for the second antenna.

Multi-path components from each of the first and second time domain sequences are extracted from each antenna, at 1006. Each of the multi-path components are multiplied, at 1008, by their respective time shifted local replica conjugates with an absolute shift specific to the first user to obtain resultant sequences.

At 1010, the absolute time shift of the local replica of the pilot sequence is modified to extract the frequency error of different co-channel users. The resultant sequence is projected, at 1010, in an upper half circle and a lower half circle. At 1014, a magnitude square of a vector sum is computed for the upper half circle and the lower half circle. Computing the magnitude square of the vector sum estimates a frequency error correction. This can be substantially the same as computing a DFT at a fraction of the sub-carrier spacing, wherein the fraction is any amount between zero and one.

At 1016, the frequency error corrections from each of the multi-path components are combined to achieve a combined frequency error correction per antenna. The resultant frequency error of each antenna is combined, at 1018, to provide an overall frequency error estimation. At 1020, the frequency error is corrected by multiplying the time domain sequences with a rotating phasor generated by a Numerically Controlled Oscillator driven by the overall combined frequency error correction.

Figure 11:
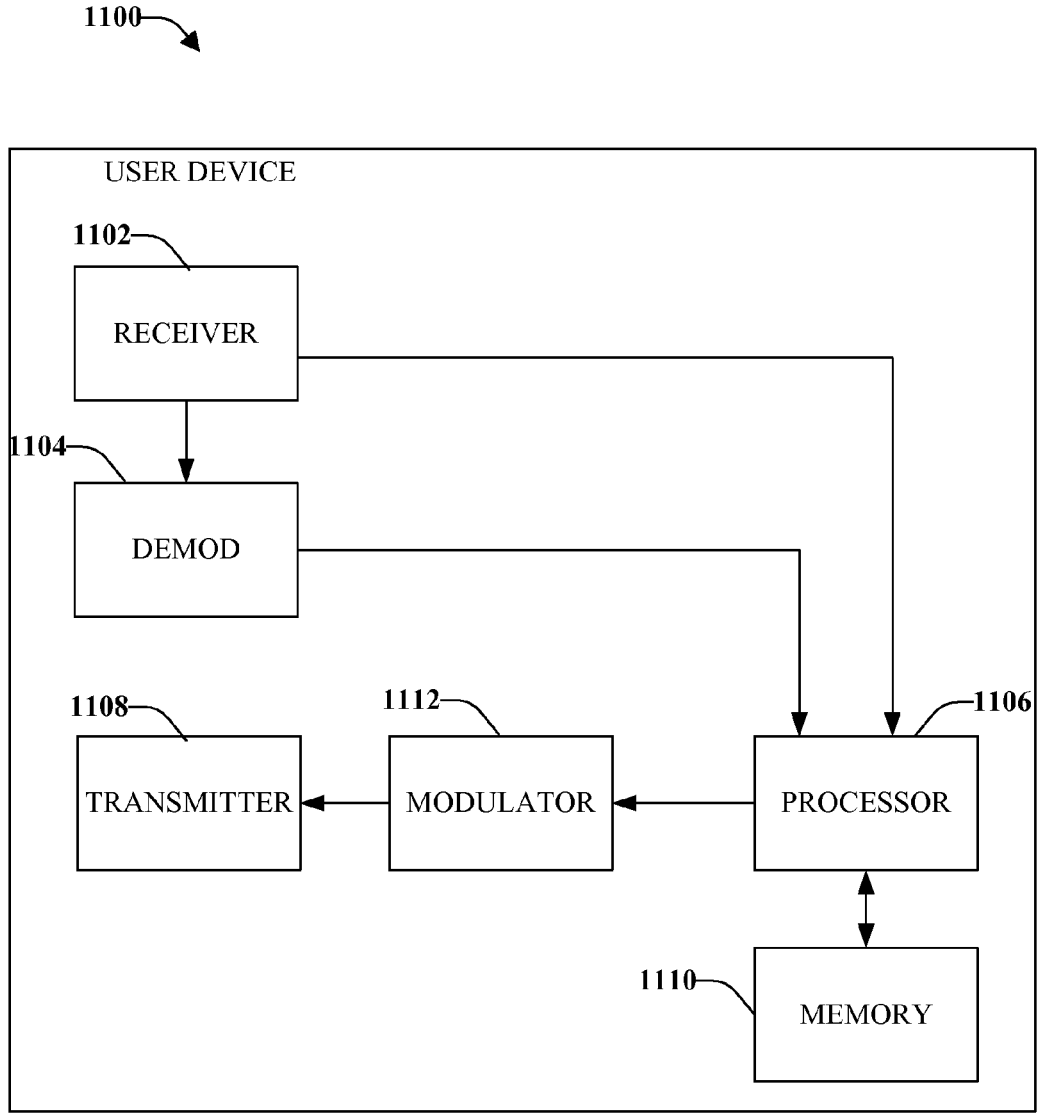
FIG. 11 illustrates a system that facilitates frequency error estimation in accordance with one or more of the disclosed aspects.

With reference now to FIG. 11, illustrated is a system 1100 that facilitates frequency error estimation in accordance with one or more of the disclosed aspects. System 1100 can reside in a user device. System 1100 comprises a receiver 1102 that can receive a signal from, for example, a receiver antenna. The receiver 1102 can perform typical actions thereon, such as filtering, amplifying, downconverting, etc. the received signal. The receiver 1102 can also digitize the conditioned signal to obtain samples. A demodulator 1104 can obtain received symbols for each symbol period, as well as provide received symbols to a processor 1106.

Processor 1106 can be a processor dedicated to analyzing information received by receiver component 1102 and/or generating information for transmission by a transmitter 1108. In addition or alternatively, processor 1106 can control one or more components of user device 1100, analyze information received by receiver 1102, generate information for transmission by transmitter 1108, and/or control one or more components of user device 1100. Processor 1106 may include a controller component capable of coordinating communications with additional user devices.

User device 1100 can additionally comprise memory 1108 operatively coupled to processor 1106 and that can store information related to coordinating communications and any other suitable information. Memory 1110 can additionally store protocols associated with frequency error estimation. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and/or methods is intended to comprise, without being limited to, these and any other suitable types of memory. User device 1100 can further comprise a symbol modulator 1112 and a transmitter 1108 that transmits the modulated signal.

Figure 12:
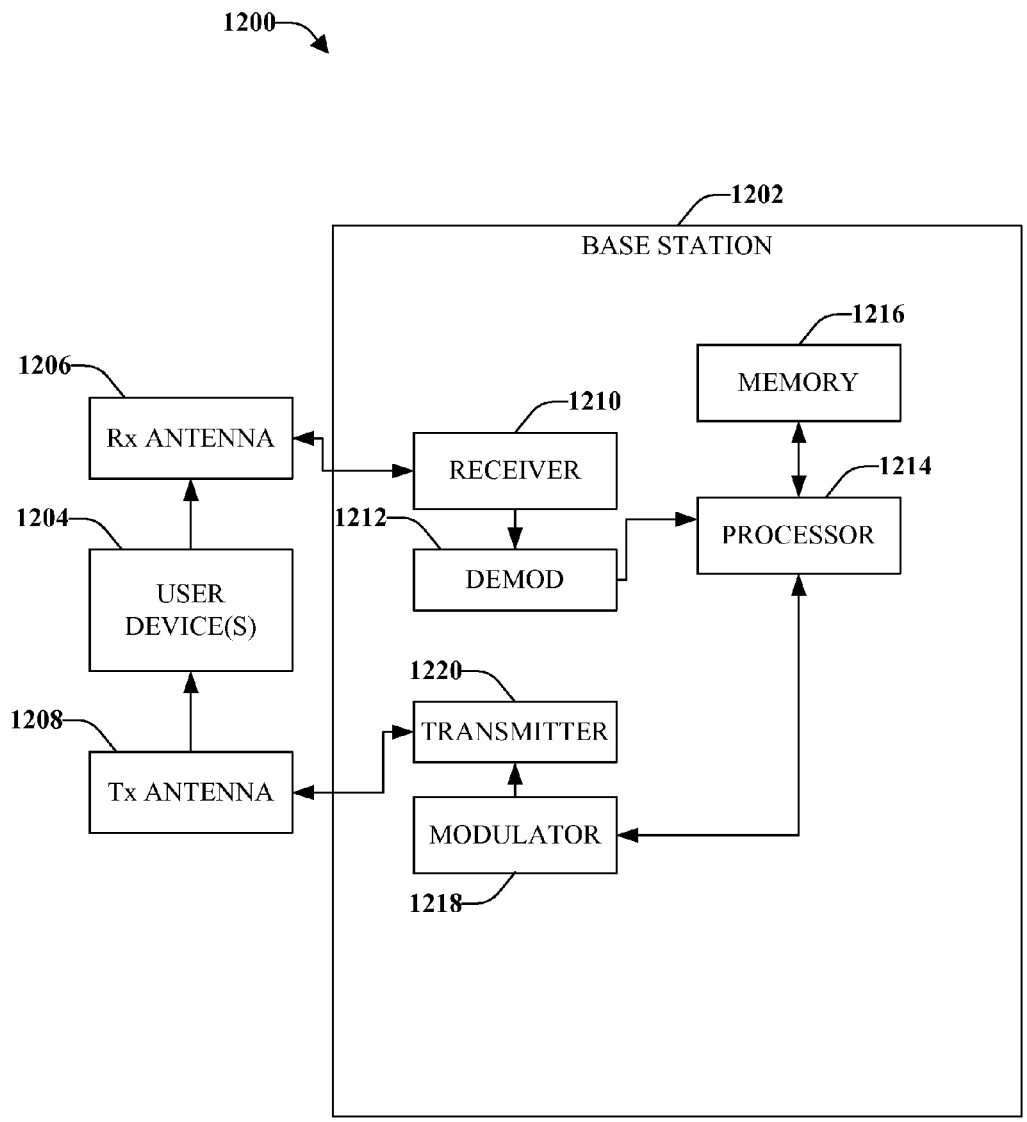
FIG. 12 illustrates a system that facilitates estimating and correcting a frequency error in accordance with various aspects presented herein.

FIG. 12 is an illustration of a system 1200 that facilitates estimating and correcting a frequency error in accordance with various aspects presented herein. System 1200 comprises a base station or access point 1202. As illustrated, base station 1202 receives signal(s) from one or more user devices 1204 by a receive antenna 1206, and transmits to the one or more user devices 1204 through a transmit antenna 1208.

Base station 1202 comprises a receiver 1210 that receives information from receive antenna 1206 and is operatively associated with a demodulator 1212 that demodulates received information. Demodulated symbols are analyzed by a processor 1214 that is coupled to a memory 1216 that stores information related to broadcast-multicast waveforms embedded in a unicast waveform. A modulator 1218 can multiplex the signal for transmission by a transmitter 1220 through transmit antenna 1208 to user devices 1204.

Figure 13:
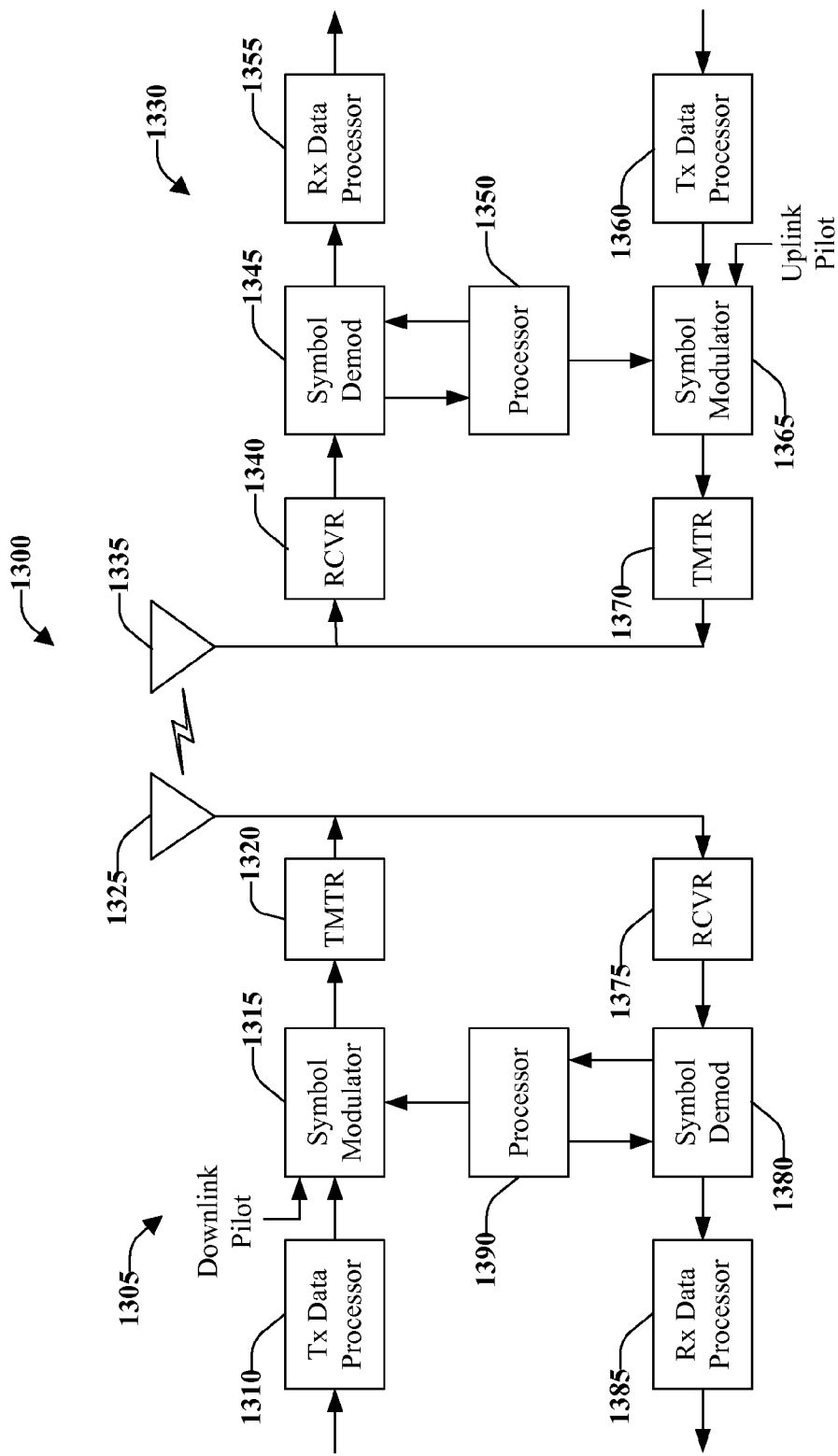
FIG. 13 illustrates an exemplary wireless communication system.

FIG. 13 illustrates an exemplary wireless communication system 1300. Wireless communication system 1300 depicts one base station and one terminal for sake of brevity. However, it is to be appreciated that system 1300 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 obtains N received symbols and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink.

Processors 1390 and 1350 direct (e.g., control, coordinate, manage, . . . ) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

Figure 14:
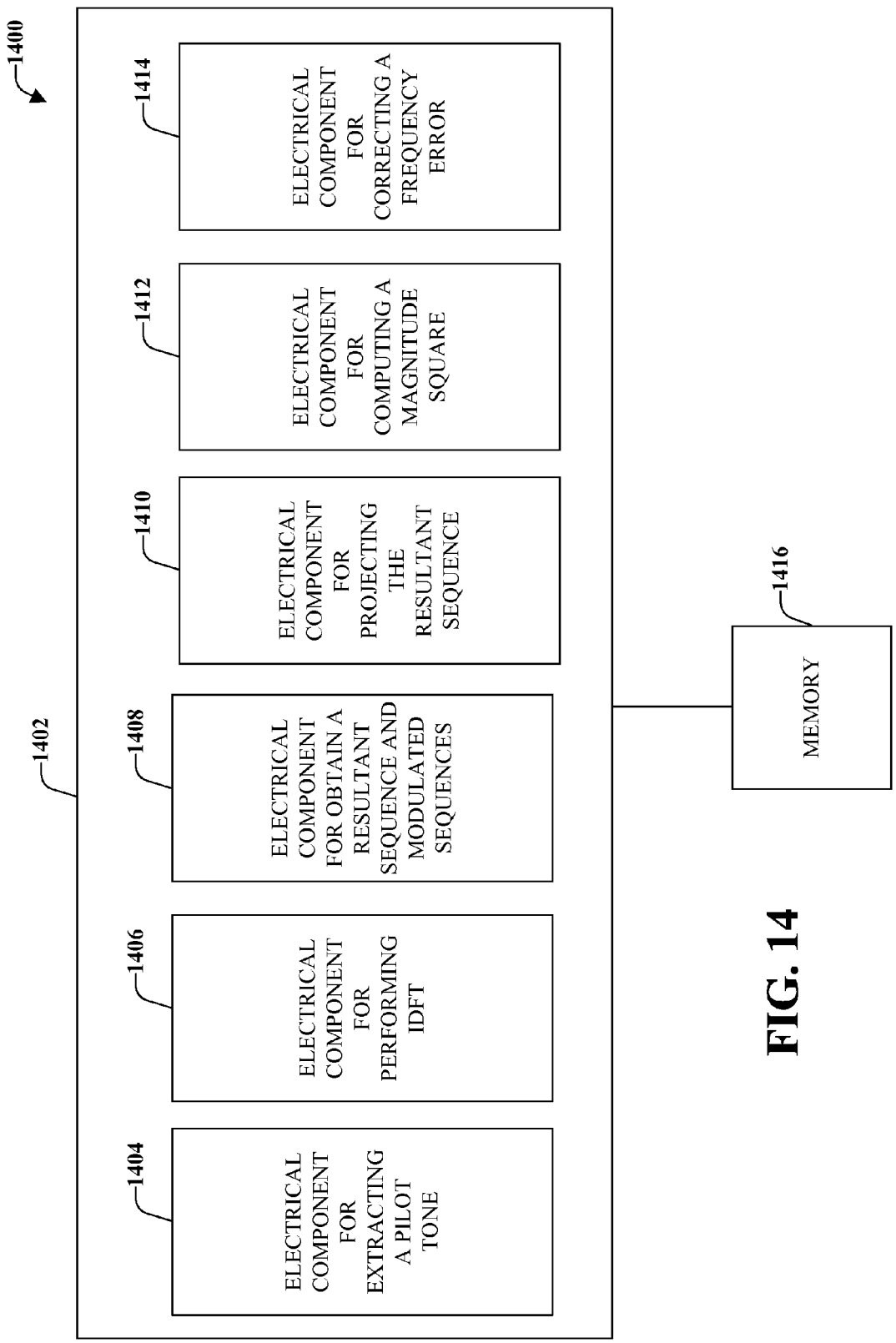
FIG. 14 illustrates an example system that estimates and corrects frequency error(s).

With reference to FIG. 14, illustrated is an example system 1400 that estimates and corrects frequency error(s). System 1400 may reside at least partially within a mobile device, a base station, or other devices. It is to be appreciated that system 1400 is represented as including functional blocks, which may be functional blocks that represent functions implemented by a processor, software, or combination thereof (e.g., firmware).

System 1400 includes a logical grouping 1402 of electrical components that can act separately or in conjunction. Logical grouping 1402 includes an electrical component 1404 for extracting a pilot tone in a frequency domain. The pilot tone can be for a first user and from a first antenna. In accordance with some aspects, the pilot tone is extracted from a single OFDM symbol carrying pilot tones. The pilot tones can occupy any bandwidth at an OFDM symbol that occurs with frequency hopping Also included in logical grouping 1402 is an electrical component 1406 for performing Inverse Discrete Fourier Transform (IDFT) to translate the frequency domain of the pilot tone into a first time domain sequence for the first antenna. An electrical component 1408 for multiplying the first time domain sequence with a conjugate of a local replica to obtain a resultant sequence and modulated sequences is also included. Logical grouping 1402 also includes an electrical component 1410 for projecting the resultant sequence and modulated sequences in an upper half circle and a lower half circle.

An electrical component 1412 for computing a magnitude square of a vector sum for the upper half circle and the lower half circle to estimate a frequency error correction is also included in logical grouping 1402. In accordance with some aspects, computing a magnitude square of a vector sum for the upper half circle and the lower half circle is a Discrete Fourier Transform computed at a fraction of a sub-carrier spacing, which can be any fraction of the sub-carrier spacing between zero and one.

Further, logical grouping 1402 includes an electrical component 1414 for correcting a frequency error by multiplying the first time domain sequence with a rotating phasor. In accordance with some aspects, the rotating phasor is generated by a Numerically Controlled Oscillator driven by a combined frequency error correction.

According to various aspects electrical component 1404 can also extract a second pilot tone in a frequency domain for the first user from a second antenna and electrical component 1406 can perform IDFT to translate the frequency domain of the second pilot tone into a second time domain sequence for the second antenna. In accordance with this aspect, logical grouping 1402 includes an electrical component for identifying multi-path components from each of the first and second time domain sequences extracted from each antenna and an electrical component for multiplying each of the multi-path components by their respective time shifted local replica conjugates with an absolute shift specific to the first user to obtain resultant sequences. Also included in logical grouping 1402 can be an electrical component for modifying the absolute time shift of the local replica of the pilot sequence to extract a frequency error of different co-channel users and an electrical component for projecting each of the resultant sequences in an upper half circle and a lower half circle. Also included is an electrical component for computing a magnitude square of a vector sum for the upper half circle and the lower half circle in order to estimate a frequency error correction and an electrical component for combining the frequency errors corrections from each of the multi-path components to achieve a combined frequency error correction per antenna. Further, logical grouping 1402, in accordance with this aspect, includes an electrical component for combining the resultant frequency error of each antenna to provide an overall frequency error estimation and an electrical component for correcting a frequency error by multiplying the time domain sequences with a rotating phasor generated by a Numerically Controlled Oscillator driven by the overall frequency error estimation.

Additionally, system 1400 can include a memory 1416 that retains instructions for executing functions associated with electrical components 1404, 1406, 1408, 1410, 1412, and 1414 or other components. While shown as being external to memory 1416, it is to be understood that one or more of electrical components 11404, 1406, 1408, 1410, 1412, and 1414 can exist within memory 1416.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:
1. A method for frequency error estimation, comprising:
extracting a pilot tone in a frequency domain for a first user from a first antenna;
performing Inverse Discrete Fourier Transform to translate the frequency domain of the pilot tone into a first time domain sequence for the first antenna;
multiplying the first time domain sequence with a conjugate of a local replica to obtain a resultant sequence and modulated sequences;
projecting the resultant sequence and modulated sequences in an upper half circle and a lower half circle;
computing a magnitude square of a vector sum for the upper half circle and the lower half circle to estimate a frequency error correction; and
correcting a frequency error by multiplying the first time domain sequence with a rotating phasor, wherein the method further comprises:
extracting a second pilot tone in a frequency domain for the first user from a second antenna;
performing Inverse Discrete Fourier Transform to translate the frequency domain of the second pilot tone into a second time domain sequence for the second antenna;
identifying multi-path components from each of the first and second time domain sequences extracted from each antenna;
multiplying each of the multi-path components by their respective time shifted local replica conjugates with an absolute shift specific to the first user to obtain resultant sequences;
modifying the absolute time shift of the local replica of the pilot sequence to extract a frequency error of different co-channel users;
projecting each of the resultant sequences in an upper half circle and a lower half circle;
computing a magnitude square of a vector sum for the upper half circle and the lower half circle in order to estimate a frequency error correction;
combining the frequency errors corrections from each of the multi-path components to achieve a combined frequency error correction per antenna;
combining the resultant frequency error of each antenna to provide an overall frequency error estimation; and
correcting a frequency error by multiplying the time domain sequences with a rotating phasor generated by a Numerically Controlled Oscillator driven by the overall frequency error estimation.

2. The method of claim 1, wherein the rotating phasor is generated by a Numerically Controlled Oscillator driven by a combined frequency error correction.

3. The method of claim 1, wherein the pilot tone is extracted from a single OFDM symbol carrying pilot tones.

4. The method of claim 3, wherein the pilot tones occupy any bandwidth at an OFDM symbol that occurs with frequency hopping.

5. The method of claim 1, wherein computing a magnitude square of a vector sum for the upper half circle and the lower half circle is a Discrete Fourier Transform computed at a fraction of a sub-carrier spacing.

6. The method of claim 5, wherein the fraction of the sub-carrier spacing is about 0.5.

7. A wireless communications apparatus, comprising:
a memory that retains instructions related to extracting a pilot tone in a frequency domain for a first user from a first antenna, performing Inverse Discrete Fourier Transform to translate the frequency domain of the pilot tone into a first time domain sequence for the first antenna, multiplying the first time domain sequence with a conjugate of a local replica to obtain a resultant sequence and modulated sequences, projecting the resultant sequence and modulated sequences in an upper half circle and a lower half circle, computing a magnitude square of a vector sum for the upper half circle and the lower half circle to estimate a frequency error correction, and correcting a frequency error by multiplying the first time domain sequence with a rotating phasor; and
a processor, coupled to the memory, configured to execute the instructions retained in the memory,
wherein the memory further retains instructions related to extracting a second pilot tone in a frequency domain for the first user from a second antenna, performing Inverse Discrete Fourier Transform to translate the frequency domain of the second pilot tone into a second time domain sequence for the second antenna, identifying multi-path components from each of the first and second time domain sequences extracted from each antenna, multiplying each of the multi-path components by their respective time shifted local replica conjugates with an absolute shift specific to the first user to obtain resultant sequences, modifying the absolute time shift of the local replica of the pilot sequence to extract a frequency error of different co-channel users, projecting each of the resultant sequences in an upper half circle and a lower half circle, computing a magnitude square of a vector sum for the upper half circle and the lower half circle in order to estimate a frequency error correction, combining the frequency errors corrections from each of the multi-path components to achieve a combined frequency error correction per antenna, combining the resultant frequency error of each antenna to provide an overall frequency error estimation, and correcting a frequency error by multiplying the time domain sequences with a rotating phasor generated by a Numerically Controlled Oscillator driven by the overall frequency error estimation.

8. The wireless communications apparatus of claim 7, wherein the rotating phasor is generated by a Numerically Controlled Oscillator driven by a combined frequency error correction.

9. The wireless communications apparatus of claim 7, wherein the pilot tone is extracted from a single OFDM symbol carrying pilot tones.

10. The wireless communications apparatus of claim 7, wherein the pilot tones occupy any bandwidth at an OFDM symbol that occurs with frequency hopping.

11. The wireless communications apparatus of claim 7, wherein computing a magnitude square of a vector sum for the upper half circle and the lower half circle is a Discrete Fourier Transform computed at a fraction of a sub-carrier spacing.

12. The wireless communications apparatus of claim 7, wherein the fraction of the sub-carrier spacing is about 0.5.

13. A wireless communications apparatus that estimates frequency error, comprising:
means for extracting a pilot tone in a frequency domain for a first user from a first antenna;
means for performing Inverse Discrete Fourier Transform to translate the frequency domain of the pilot tone into a first time domain sequence for the first antenna;
means for multiplying the first time domain sequence with a conjugate of a local replica to obtain a resultant sequence and modulated sequences;
means for projecting the resultant sequence and modulated sequences in an upper half circle and a lower half circle;
means for computing a magnitude square of a vector sum for the upper half circle and the lower half circle to estimate a frequency error correction; and
means for correcting a frequency error by multiplying the first time domain sequence with a rotating phasor,
wherein the wireless communications apparatus further comprises:
means for extracting a second pilot tone in a frequency domain for the first user from a second antenna;
means for performing Inverse Discrete Fourier Transform to translate the frequency domain of the second pilot tone into a second time domain sequence for the second antenna;
means for identifying multi-path components from each of the first and second time domain sequences extracted from each antenna;

means for multiplying each of the multi-path components by their respective time shifted local replica conjugates with an absolute shift specific to the first user to obtain resultant sequences;

means for modifying the absolute time shift of the local replica of the pilot sequence to extract a frequency error of different co-channel users;

means for projecting each of the resultant sequences in an upper half circle and a lower half circle;

means for computing a magnitude square of a vector sum for the upper half circle and the lower half circle in order to estimate a frequency error correction;

means for combining the frequency errors corrections from each of the multi-path components to achieve a combined frequency error correction per antenna;

means for combining the resultant frequency error of each antenna to provide an overall frequency error estimation; and means for correcting a frequency error by multiplying the time domain sequences with a rotating phasor generated by a Numerically Controlled Oscillator driven by the overall frequency error estimation.

14. The wireless communications apparatus of claim 13, wherein the rotating phasor is generated by a Numerically Controlled Oscillator driven by a combined frequency error correction.

15. The wireless communications apparatus of claim 13, wherein the pilot tone is extracted from a single OFDM symbol carrying pilot tones.

16. The wireless communications apparatus of claim 13, wherein the pilot tones occupy any bandwidth at an OFDM symbol that occurs with frequency hopping.

17. The wireless communications apparatus of claim 13, wherein computing a magnitude square of a vector sum for the upper half circle and the lower half circle is a Discrete Fourier Transform computed at a fraction of a sub-carrier spacing.

18. The wireless communications apparatus of claim 13, wherein the fraction of the sub-carrier spacing is about between 0 and 1.

19. A computer program product, comprising:
a non-transitory computer-readable medium comprising:
a first set of codes for causing a computer to extract a pilot tone in a frequency domain for a first user from a first antenna;
a second set of codes for causing the computer to perform Inverse Discrete Fourier Transform to translate the frequency domain of the pilot tone into a first time domain sequence for the first antenna;
a third set of codes for causing the computer to multiply the first time domain sequence with a conjugate of a local replica to obtain a resultant sequence and modulated sequences;
a fourth set of codes for causing the computer to project the resultant sequence and modulated sequences in an upper half circle and a lower half circle;
a fifth set of codes for causing the computer to compute a magnitude square of a vector sum for the upper half circle and the lower half circle to estimate a frequency error correction; and
a sixth set of codes for causing the computer to correct a frequency error by multiplying the first time domain sequence with a rotating phasor,
wherein the non-transitory computer-readable medium further comprises:

a seventh set of codes for extracting a second pilot tone in a frequency domain for the first user from a second antenna;

an eighth set of codes for performing Inverse Discrete Fourier Transform to translate the frequency domain of the second pilot tone into a second time domain sequence for the second antenna;

a ninth set of codes for identifying multi-path components from each of the first and second time domain sequences extracted from each antenna;

a tenth set of codes for multiplying each of the multi-path components by their respective time shifted local replica conjugates with an absolute shift specific to the first user to obtain resultant sequences;

an eleventh set of codes for modifying the absolute time shift of the local replica of the pilot sequence to extract a frequency error of different co-channel users;

a twelfth set of codes for projecting each of the resultant sequences in an upper half circle and a lower half circle;

a thirteenth set of codes for computing a magnitude square of a vector sum for the upper half circle and the lower half circle in order to estimate a frequency error correction;

a fourteenth set of codes for combining the frequency errors corrections from each of the multi-path components to achieve a combined frequency error correction per antenna;

a fifteenth set of codes for combining the resultant frequency error of each antenna to provide an overall frequency error estimation; and a sixteenth set of codes for correcting a frequency error by multiplying the time domain sequences with a rotating phasor generated by a Numerically Controlled Oscillator driven by the overall frequency error estimation.

20. The computer program product of claim 19, wherein the rotating phasor is generated by a Numerically Controlled Oscillator driven by a combined frequency error correction.

21. The computer program product of claim 19, wherein the pilot tone is extracted from a single OFDM symbol carrying pilot tones.

22. The computer program product of claim 19, wherein computing a magnitude square of a vector sum for the upper half circle and the lower half circle is a Discrete Fourier Transform computed at a fraction of a sub-carrier spacing.

23. At least one processor configured to estimate and correct a frequency error, comprising:
a first module for extracting a pilot tone in a frequency domain for a first user from a first antenna;
a second module for performing Inverse Discrete Fourier Transform to translate the frequency domain of the pilot tone into a first time domain sequence for the first antenna;
a third module for multiplying the first time domain sequence with a conjugate of a local replica to obtain a resultant sequence and modulated sequences;
a fourth module for projecting the resultant sequence and modulated sequences in an upper half circle and a lower half circle;
a fifth module for computing a magnitude square of a vector sum for the upper half circle and the lower half circle to estimate a frequency error correction; and
a sixth module for correcting a frequency error by multiplying the first time domain sequence with a rotating phasor, wherein the at least one processor further comprises:

a seventh module for extracting a second pilot tone in a frequency domain for the first user from a second antenna;

an eighth module for performing Inverse Discrete Fourier Transform to translate the frequency domain of the second pilot tone into a second time domain sequence for the second antenna;

a ninth module for identifying multi-path components from each of the first and second time domain sequences extracted from each antenna;

a tenth module for multiplying each of the multi-path components by their respective time shifted local replica conjugates with an absolute shift specific to the first user to obtain resultant sequences;

an eleventh module for modifying the absolute time shift of the local replica of the pilot sequence to extract a frequency error of different co-channel users;

a twelfth module for projecting each of the resultant sequences in an upper half circle and a lower half circle;

a thirteenth module for computing a magnitude square of a vector sum for the upper half circle and the lower half circle in order to estimate a frequency error correction;

a fourteenth module for combining the frequency errors corrections from each of the multi-path components to achieve a combined frequency error correction per antenna;

a fifteenth module for combining the resultant frequency error of each antenna to provide an overall frequency error estimation; and a sixteenth module for correcting a frequency error by multiplying the time domain sequences with a rotating phasor generated by a Numerically Controlled Oscillator driven by the overall frequency error estimation.

24. The processor of claim 23, wherein the pilot tone is extracted from a single OFDM symbol carrying pilot tones.

25. The processor of claim 23, wherein computing a magnitude square of a vector sum for the upper half circle and the lower half circle is a Discrete Fourier Transform computed at a fraction of a sub-carrier spacing.

* * * * *